United States Patent
Cho

(10) Patent No.: US 9,610,859 B1
(45) Date of Patent: Apr. 4, 2017

(54) SYSTEM AND METHOD FOR CONTROLLING IMPACT REDUCTION OF ELECTRIC VEHICLE

(71) Applicant: Hyundai Motor Company, Seoul (KR)

(72) Inventor: Woocheol Cho, Daejeon (KR)

(73) Assignee: Hyundai Motor Company, Seoul (KR)

( * ) Notice: Subject to any disclaimer, the term of this patent is extended or adjusted under 35 U.S.C. 154(b) by 1 day.

(21) Appl. No.: 14/938,959

(22) Filed: Nov. 12, 2015

(30) Foreign Application Priority Data

Sep. 10, 2015 (KR) .................. 10-2015-0128554

(51) Int. Cl.
*B60L 9/00* (2006.01)
*B60L 15/20* (2006.01)
*B60K 6/54* (2007.10)
*B60K 6/46* (2007.10)

(52) U.S. Cl.
CPC .............. *B60L 15/20* (2013.01); *B60K 6/46* (2013.01); *B60K 6/54* (2013.01); *B60L 2240/423* (2013.01); *B60L 2250/24* (2013.01); *B60L 2250/26* (2013.01); *B60Y 2200/92* (2013.01); *B60Y 2300/181* (2013.01); *B60Y 2300/30* (2013.01); *B60Y 2300/43* (2013.01); *B60Y 2300/60* (2013.01); *B60Y 2300/65* (2013.01); *Y10S 903/93* (2013.01)

(58) Field of Classification Search
CPC .............. B60L 15/20; B60L 2240/423; B60L 2250/24; B60L 2250/26; B60K 6/46; B60K 6/54; B60Y 2300/30; B60Y 2300/43; B60Y 2300/60; B60Y 2300/65; Y10S 903/93

See application file for complete search history.

(56) References Cited

U.S. PATENT DOCUMENTS

| 8,239,107 | B2 | 8/2012 | Mair | |
|---|---|---|---|---|
| 2012/0316034 | A1* | 12/2012 | Lim | B60W 10/06 477/183 |
| 2014/0107877 | A1* | 4/2014 | Bang | B60L 11/14 701/22 |
| 2014/0366682 | A1* | 12/2014 | Murata | B60W 10/02 74/572.2 |

(Continued)

FOREIGN PATENT DOCUMENTS

| JP | 08268320 | A | * | 10/1996 |
| JP | 2013018423 | A | * | 1/2013 |

(Continued)

*Primary Examiner* — Tuan C. To
(74) *Attorney, Agent, or Firm* — Mintz Levin Cohn Ferris Glovsky and Popeo, P.C.; Peter F. Corless

(57) ABSTRACT

A system and method for controlling impact reduction of an electric vehicle can reduce the impact generated while releasing a P stage of a shift lever on a sloped road. The method and system utilize a motor as a power source, and the method includes: determining whether a torque applying condition is satisfied when a release of the P stage of the shift lever is required on a sloped road; calculating a torque for impact reduction when the torque applying condition is satisfied; applying the torque for impact reduction and controlling anti-jerk to change; stopping applying the torque for impact reduction when a vehicle speed is greater than or equal to a predetermined speed; and controlling anti-jerk to restore when the release of the P stage of the shift lever is completed.

11 Claims, 8 Drawing Sheets

(56) References Cited

U.S. PATENT DOCUMENTS

2015/0027798 A1\* 1/2015 Nagamori ........... B60L 15/2081
                                                  180/243
2016/0339888 A1\* 11/2016 Yokoyama .............. B60T 7/042

FOREIGN PATENT DOCUMENTS

| JP | 2013164105 A | \* | 8/2013 |
| JP | 2013203383 A | \* | 10/2013 |
| KR | 2011-0053092 A | | 5/2011 |
| KR | 2012-0137131 A | | 12/2012 |
| KR | 10-2014-0049638 A | | 4/2014 |

\* cited by examiner

SYSTEM AND METHOD FOR CONTROLLING IMPACT REDUCTION OF ELECTRIC VEHICLE

CROSS-REFERENCE TO RELATED APPLICATION

This application claims under 35 U.S.C. §119(a) the benefit of Korean Patent Application No. 10-2015-0128554 filed in the Korean Intellectual Property Office on Sep. 10, 2015, the entire contents of which are incorporated herein by reference.

BACKGROUND (a) Field of the Invention

The present invention relates to a system and a method for controlling impact reduction of an electric vehicle, more particularly, to a system and a method for controlling impact reduction of an electric vehicle that reduces impact generated while releasing a P stage of a shift lever on a sloped road.

(b) Description of the Related Art

Generally, environmentally-friendly vehicles such as an electric vehicle, a fuel cell vehicle and a hybrid electric vehicle are operated by a driving motor which generates torque by electrical energy.

The electric vehicle only uses power of the driving motor operated by power of a battery. On the contrary, the hybrid electric vehicle uses power of an internal combustion engine and power of the driving motor in combination.

If the electric vehicle is parked on a sloped road, torque is exerted on the wheel by a vehicle weight, so that a parking gear, a drive shaft, and a wheel drive shaft are sequentially distorted and energy is accumulated. Thus, the electric vehicle generates a momentary impact in accordance with releasing the accumulated energy. The accumulated energy due to distortion of a driving system may be increased in proportion to the vehicle weight and a degree of a road slope, and may cause a serious impact.

According to a conventional art, hardware systems have been improved such as a structure change of a parking gear or a parking sprag in order to reduce the impact. However, there is a limitation in reducing impact by improving hardware system without reducing the accumulated energy due to distortion of the driving system, which is a root cause of the problem. Moreover, the vehicle provided with a shift by wire (SBW) system uses an actuator of high torque, so the vehicle weight and the manufacturing cost may be increased.

The above information disclosed in this Background section is only for enhancement of understanding of the background of the invention and therefore it may contain information that does not form the prior art that is already known in this country to a person of ordinary skill in the art.

SUMMARY

The present invention provides a system and a method for controlling impact reduction of an electric vehicle having advantages of reducing impact generated while releasing a P stage of a shift lever on a sloped road by applying a torque for impact reduction and by differentiating anti-jerk control.

An exemplary embodiment of the present invention provides a method for controlling impact reduction of an electric vehicle including a motor as a power source that may includes determining whether a torque applying condition is satisfied when a release of a P stage of a shift lever is required on a sloped road; calculating a torque for impact reduction when the torque applying condition is satisfied; applying the torque for impact reduction and controlling anti-jerk to change; stopping applying the torque for impact reduction when a vehicle speed is greater than or equal to a predetermined speed; and controlling anti-jerk to restore when the release of the P stage of the shift lever is completed.

The torque for impact reduction may be calculated based on a vehicle weight, a wheel radius, a shift ratio, and an amount of braking requirement.

The torque applying condition may be satisfied when an acceleration sensor is not in a malfunction state, the vehicle speed is less than the predetermined speed, and the amount of braking requirement is greater than or equal to a predetermined value.

The change control of anti-jerk may adjust an anti-jerk gain and a coefficient of a vibration component extraction filter according to a degree of road slope.

The method may further include controlling anti-jerk to change; and controlling anti-jerk to restore when the release of the P stage of the shift lever is completed, when the torque applying condition is not satisfied.

Another exemplary embodiment of the present invention provides a system for controlling impact reduction of an electric vehicle including a motor as a power source that may include a driving information detector configured to detect a vehicle speed, a degree of road slope, a position value of a brake pedal, and a shift lever of the electric vehicle; and a controller configured to control a motor torque based on a signal from the driving information detector, wherein the controller may determine whether a torque applying condition is satisfied when a release of a P stage of the shift lever is required on a sloped road, calculate a torque for impact reduction when the torque applying condition is satisfied, apply the torque for impact reduction, control anti-jerk to change, stop applying the torque for impact reduction when a vehicle speed is greater than or equal to a predetermined speed, and control anti-jerk to restore when the release of the P stage of the shift lever is completed.

The controller may calculate the torque for impact reduction based on a vehicle weight, a wheel radius, a shift ratio, and an amount of braking requirement.

The controller may determine that the torque applying condition is satisfied when an acceleration sensor is not in a malfunction state, the vehicle speed is less than the predetermined speed, and the amount of braking requirement is greater than or equal to a predetermined value.

The controller may control anti-jerk to change by adjusting an anti-jerk gain and a coefficient of a vibration component extraction filter according to the degree of road slope.

The controller may control anti-jerk to change when the torque applying condition is not satisfied and controls anti-jerk to restore when the release of the P stage of the shift lever is completed.

A non-transitory computer readable medium containing program instructions executed by a processor can include: program instructions that determine whether a torque applying condition is satisfied when a release of a P stage of a shift lever is required on a sloped road; program instructions that calculate a torque for impact reduction when the torque applying condition is satisfied; program instructions that apply the torque for impact reduction and controlling anti-jerk to change; program instructions that stop applying the torque for impact reduction when a vehicle speed is greater than or equal to a predetermined speed; and program instructions that control anti-jerk to restore when the release of the P stage of the shift lever is completed.

As described above, according to an exemplary embodiment of the present invention, impact of the electric vehicle generated while releasing the P stage on the sloped road can be reduced by applying the torque for impact reduction to minimize distortion of the driving system.

In addition, impact of the electric vehicle can be reduced by differentiating anti-jerk control in accordance with the degree of road slope, and the manufacture cost may be decreased in case of the electric vehicle providing with the SBW system.

DETAILED DESCRIPTION OF THE EMBODIMENTS

Figure 1:
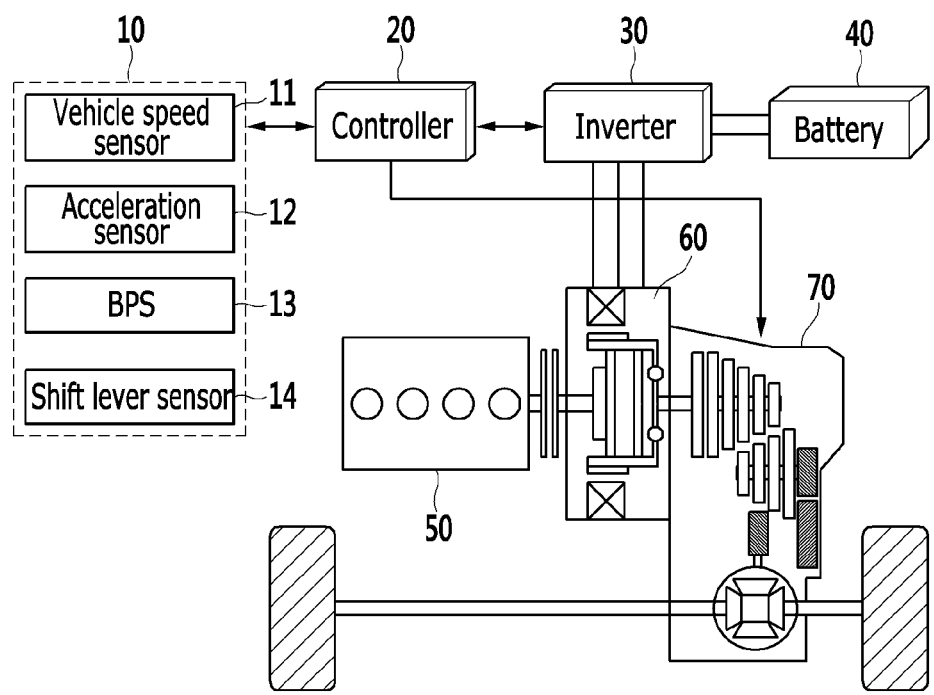
FIG. 1 is a schematic block diagram of a system for controlling impact reduction of an electric vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. The terminology used herein is for the purpose of describing particular embodiments only and is not intended to be limiting of the invention. As used herein, the singular forms "a," "an" and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Like reference numerals designate like constituent elements throughout the specification.

In the present specification and the claims, it shall be appreciated that an electric vehicle refers to any vehicle using electricity as a power source, such as a plug in hybrid electric vehicle (PHEV) or hybrid electric vehicle (HEV) using electricity as a part of a power source, as well as an electric vehicle (EV) using electricity as the entirety of a power source.

Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

An exemplary embodiment of the present invention will hereinafter be described in detail with reference to the accompanying drawings.

FIG. 1 is a schematic block diagram of a system for controlling impact reduction of an electric vehicle according to an exemplary embodiment of the present invention.

As shown in FIG. 1, a system for controlling impact reduction of an electric vehicle according to an exemplary embodiment of the present invention includes a driving information detector 10, a controller 20, an inverter 30, a battery 40, an engine 50, a motor 60 and a transmission 70.

The driving information detector 10 includes a vehicle speed sensor 11, an acceleration sensor 12, a brake pedal position sensor 13 and a shift lever sensor 14.

The vehicle speed sensor 11 detects a speed of the electric vehicle, and transmits a corresponding signal to the controller 20. The vehicle speed sensor 11 may be mounted at a wheel of the electric vehicle.

The acceleration sensor 12 detects an acceleration of the electric vehicle, and transmits a corresponding signal to the controller 20. The controller 20 may detect a degree of a road slope by using the acceleration sensor 12.

The brake pedal position sensor (BPS) 13 continuously detects a position value of a brake pedal and transmits a monitoring signal to the controller 20. The position value of the brake pedal may be 100% when the brake pedal is pressed fully, and the position value of the brake pedal may be 0% when the brake pedal is not pressed at all.

The shift lever sensor 14 detects a position of a shift lever that a driver selects, and transmits a corresponding signal to the controller 20. The shift lever sensor 14 may include an inhibitor switch.

The inverter 30 drives the motor 60 by converting a DC voltage supplied from the battery 40 into a three-phase alternating voltage in response to a control signal from the controller 20.

The inverter 30 is composed of a plurality of power switching elements, and the power switching elements of the inverter 30 may each be implemented by any one of an IGBT (insulated gate bipolar transistor), a MOSFET, a transistor, and a relay.

The battery 40 is formed with a plurality of unit cells, and a high voltage for providing a driving voltage to the motor 60 is stored in the battery 40. The battery 40 is controlled by a battery management system (not shown) according to a charging state, and is prevented from overcharging under a critical voltage or over a critical voltage. The battery management system may transfer a charge state of the battery 40 to the controller 20 to enable a driving and regeneration control of the motor 60 to be executed.

The engine 50 which is usually included in a hybrid electric vehicle outputs power as a power source while turning on based on a control signal from the controller 20.

The motor 60 is operated by a three-phase AC voltage applied from the inverter 30 to generate torque, and operates as a power generator and supplies regenerative energy to the battery 40 during coasting.

The transmission 70 adjusts a shift ratio by operating engagement elements and disengagement elements, using hydraulic pressure according to a control signal from the controller 20.

If the engine 50 is included in the electric vehicle, the engine clutch (not shown) may be disposed between the engine 50 and the driving motor 60 so that it provides an EV mode and an HEV mode.

The controller 20 determines whether a torque applying condition is satisfied when a release of a P stage (parking stage) of the shift lever is required on a sloped road, calculates and applies a torque for impact reduction when the torque applying condition is satisfied, and controls anti-jerk to change.

In addition, after changing anti-jerk, the controller 20 stops applying the torque for impact reduction when a vehicle speed is greater than or equal to a predetermined speed, and controls anti-jerk to restore when the release of the P stage of the shift lever is completed.

The controller 20 controls anti-jerk to change without applying the torque for impact reduction when the torque applying condition is not satisfied, and controls anti-jerk to restore when the release of the P stage of the shift lever is completed.

Therefore, torque for impact reduction may be applied to minimize distortion of a driving system which is generated while releasing the P stage of the shift lever on the sloped road, and anti-jerk may be controlled by differentiating due to the degree of the road slope.

To this end, the controller 20 may be implemented as at least one processor that is operated by a predetermined program, and the predetermined program may be programmed in order to perform each step of a method for controlling impact reduction of an electric vehicle according to an exemplary embodiment of the present invention.

Various embodiments described herein may be implemented within a recording medium that may be read by a computer or a similar device by using software, hardware, or a combination thereof, for example.

According to hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units designed to perform any other functions.

According to software implementation, embodiments such as procedures and functions described in the present embodiments may be implemented by separate software modules. Each of the software modules may perform one or more functions and operations described in the present invention. A software code may be implemented by a software application written in an appropriate program language.

Hereinafter, a method for controlling impact reduction of an electric vehicle according to an exemplary embodiment of the present invention will be described in detail with reference to FIG. 2 to FIG. 5.

Figure 2:
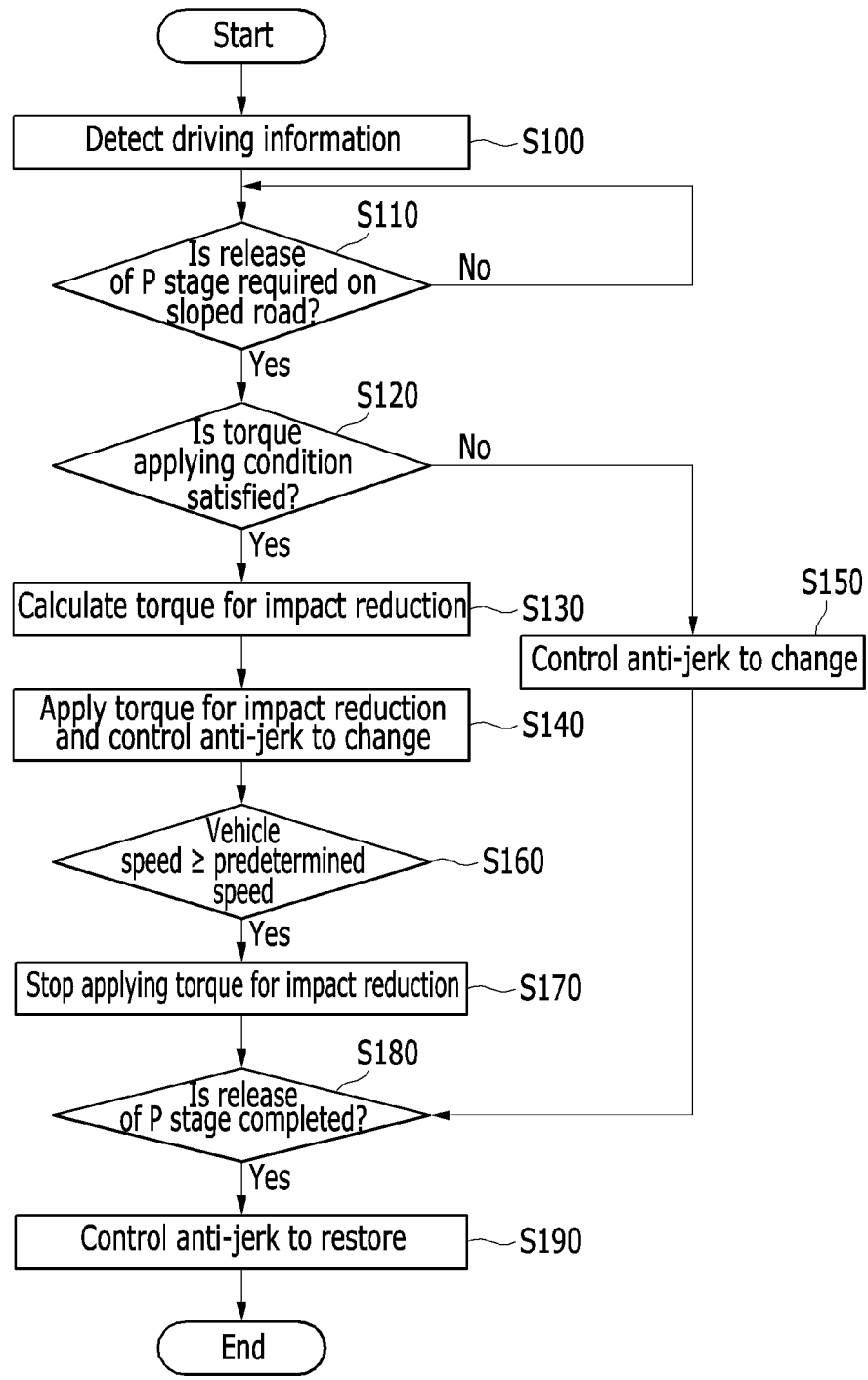
FIG. 2 is a flowchart showing a method for controlling impact reduction of an electric vehicle according to an exemplary embodiment of the present invention.

FIG. 2 is a flowchart showing a method for controlling impact reduction of an electric vehicle according to an exemplary embodiment of the present invention.

As shown in FIG. 2, a method for controlling impact reduction of an electric vehicle according to an exemplary embodiment of the present invention starts with detecting driving information for reducing impact of the electric vehicle at step S100.

The controller 20 determines whether a release of a P stage (parking stage) of a shift lever is required on a sloped road based on the driving information detected at the step S100 at step S110.

When the release of the P stage of the shift lever is required on the sloped at the step S110, the controller 20 determines whether a torque applying condition is satisfied at step S120.

The torque applying condition is satisfied when an acceleration sensor 12 is not in a malfunction state, a vehicle speed is less than a predetermined speed, and an amount of braking requirement is greater than or equal to a predetermined value.

If the acceleration sensor 12 is out of order (malfunctioned), a degree of a road slope of the electric vehicle is not detected, so the torque applying condition is determined to be satisfied when the acceleration sensor 12 has not malfunctioned.

In case that the vehicle speed is less than the predetermined speed, it may mean that the electric vehicle has stopped. That is, the predetermined speed may be 0 (zero).

If the amount of braking requirement is greater than or equal to the predetermined value, sudden acceleration which may occur when applying a wrong torque in accordance with an error of detecting the degree of the road slope can be prevented because a position value of a brake pedal is greater than or equal to the predetermined value. That is, the predetermined value may be determined according to the degree of the road slope and a size of the torque for impact reduction.

Herein, if a type of the shift lever is a gate type or a shift by wire (SBW) type, the torque applying condition may be determined to be satisfied when the shift lever is the P stage and a brake is operating. On the contrary, if the type of the shift lever is a line type, the torque applying condition may be determined to be satisfied when the shift lever is the P stage, the brake is operating, and an operation button of the shift lever is turned on.

When the torque applying condition is satisfied at the step S120, the controller 20 calculates the torque for impact reduction at step S130.

The torque for impact reduction may be calculated based on a vehicle weight, a wheel radius, a shift ratio, and an amount of braking requirement.

Figure 3:
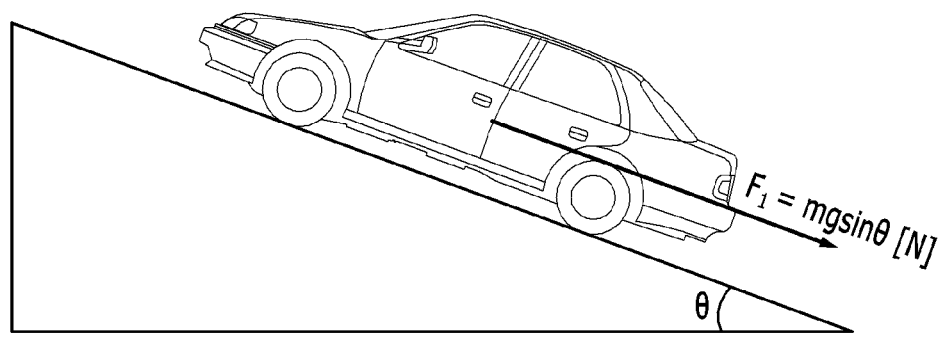
FIG. 3 is a schematic depiction of a force applied to an electric vehicle on a sloped road in order to calculate a torque for impact reduction according to an exemplary embodiment of the present invention.

FIG. 3 is a drawing describing force applied to an electric vehicle on a sloped road in order to calculate a torque for impact reduction according to an exemplary embodiment of the present invention.

In case that the electric vehicle of which a weight is m stops on the sloped road of which an angle is θ, a gravitational force of the electric vehicle F1 is m*g*sin θ[N] (g denotes a gravity acceleration).

At this time, the electric vehicle is thrust backward or forward by the force F1 when the P stage of the shift lever is released. Thus, the force F1 may cause distortion of a driving system of the electric vehicle such as a parking gear, a drive shaft, and a wheel drive shaft because the parking gear and a sprag are engaged.

A size of distortion of the driving system may be calculated by multiplying the force F1 by a wheel radius of the electric vehicle. In addition, the size of distortion changed to torque unit may be calculated by the following equation.

$$F2 = F1 * \text{wheel radius/shift ratio} = m*g*\sin\theta * \text{wheel radius/shift ratio [Nm]}$$

Herein, m denotes is a weight of the electric vehicle, g denotes a gravity acceleration, and θ denotes an angle of the sloped road. Also, a deceleration ratio may be used instead of the shift ratio.

Therefore, if the torque F2 is applied to the motor of the electric vehicle while releasing the P stage of the shift lever on the sloped road, impact due to distortion of the driving system can be reduced.

When the torque for impact reduction is calculated at the step S130, the controller 20 applies the calculated torque for impact reduction and controls anti-jerk to change at step S140.

If the controller 20 may correctly know the weight of the electric vehicle and the degree of road slope, the impact generated while releasing the P stage can be minimized by applying the calculated torque for impact reduction. However, the degree of road slope detected on the basis of the acceleration sensor may have an error, and the weight of the electric vehicle may be changed by a number of passengers or an amount of baggage. Thus, there is a limitation to reduce impact by only applying the torque for impact reduction. Moreover, if the torque for impact reduction is excessively applied before the release of the P stage of the shift lever is completed, durability of the sprag may be deteriorated.

Accordingly, the controller 20 may minimize the impact generated while releasing the P stage by adjusting an anti-jerk gain and a coefficient of a vibration component extraction filter according to the degree of road slope.

The anti-jerk gain may be mapped as a value in the range of 0 to 1 based on a maximum torque of anti-jerk, a minimum torque of anti-jerk, a model speed filter, and a vibration component extraction filter.

After that, the controller 20 compares a vehicle speed with a predetermined speed at step S160.

When the vehicle speed is greater than or equal to the predetermined speed at the step S160, the controller 20 stops applying the torque for impact reduction at step S170.

When the applying of the torque for impact reduction is stopped at the step S170, the controller 20 determines whether the release of the P stage of the shift lever is completed at step S180, and controls anti-jerk to restore when the release of the P stage of the shift lever is completed at step S190.

On the contrary, when the torque applying condition is not satisfied at the step S120, the controller 20 controls anti-jerk to change without applying the torque for impact reduction at step S150.

After that, the controller 20 proceeds the process to the step S180 to determine whether the release of the P stage of the shift lever is completed, and controls anti-jerk to restore when the release of the P stage of the shift lever is completed at step S190.

Figure 4A:
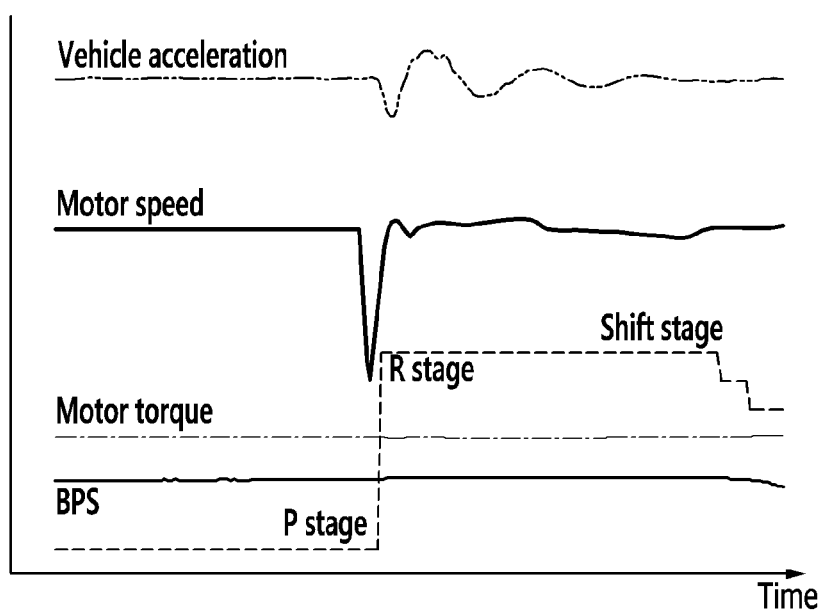
FIG. 4(a) is a graph showing a state of an electric vehicle while releasing a P stage of a shift lever according to a conventional art.
Figure 4B:
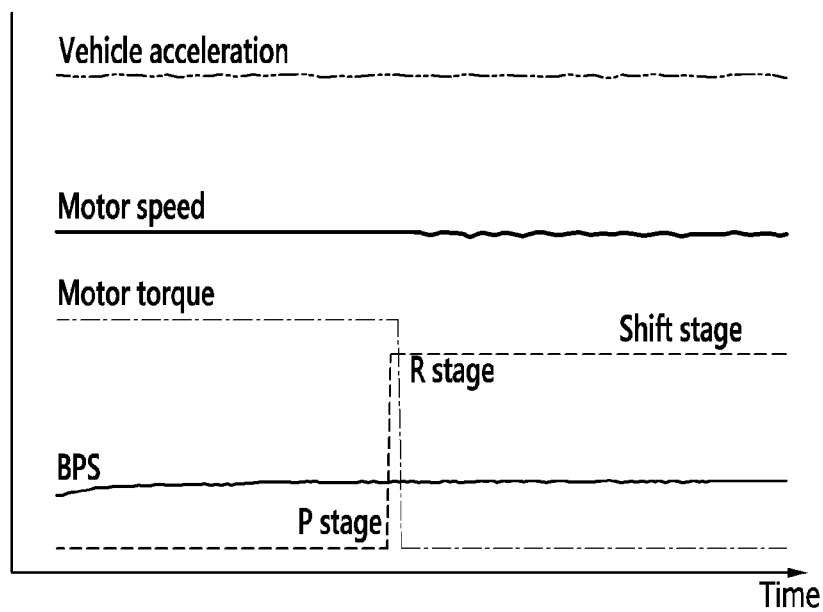
FIG. 4(b) is a graph showing a state of an electric vehicle to which a torque for impact reduction is applied while releasing a P stage of a shift lever according to an exemplary embodiment of the present invention.

FIG. 4(a) is a drawing showing a state of an electric vehicle while releasing a P stage of a shift lever according to a conventional art, and FIG. 4(b) is a drawing showing a state of an electric vehicle to which a torque for impact reduction is applied while releasing a P stage of a shift lever according to an exemplary embodiment of the present invention.

As shown in FIG. 4(a), a vehicle acceleration and a motor speed of the electric vehicle are sharply changed while releasing the P stage according to the conventional art, thereby generating impact.

On the other hand, as shown in FIG. 4(b), since the torque for impact reduction is applied according to an exemplary embodiment of the present invention, the vehicle acceleration and the motor speed of the electric vehicle are constantly maintained.

Figure 5A:
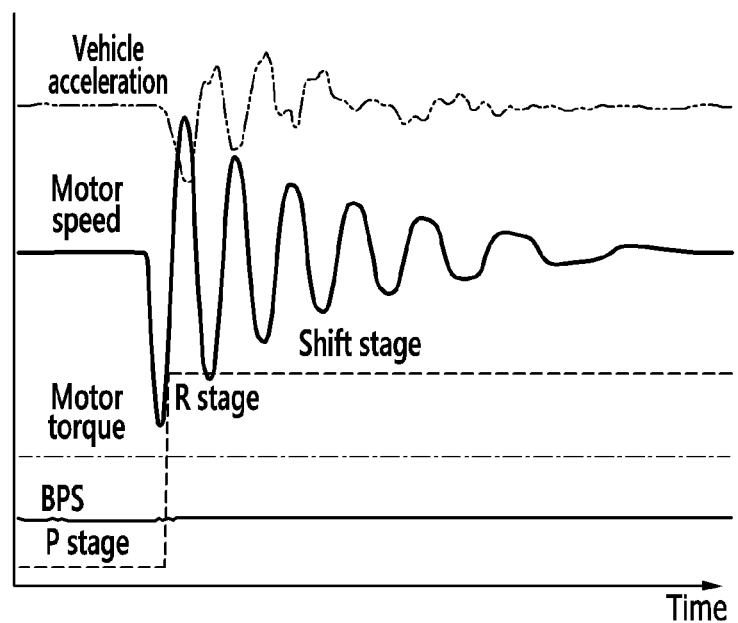
FIG. 5(a) is a graph showing a state of an electric vehicle to which anti-jerk is not applied.
Figure 5B:
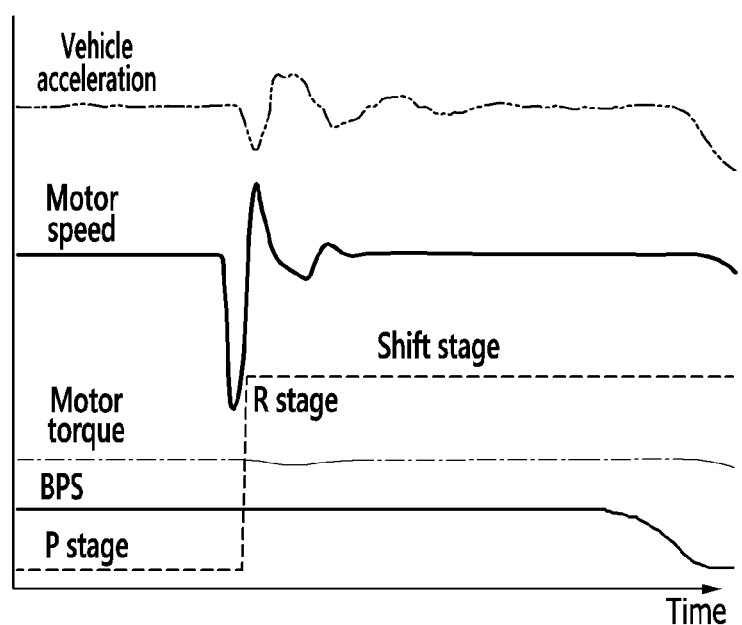
FIG. 5(b) is a graph showing a state of an electric vehicle to which anti-jerk is applied according to a conventional art.
Figure 5C:
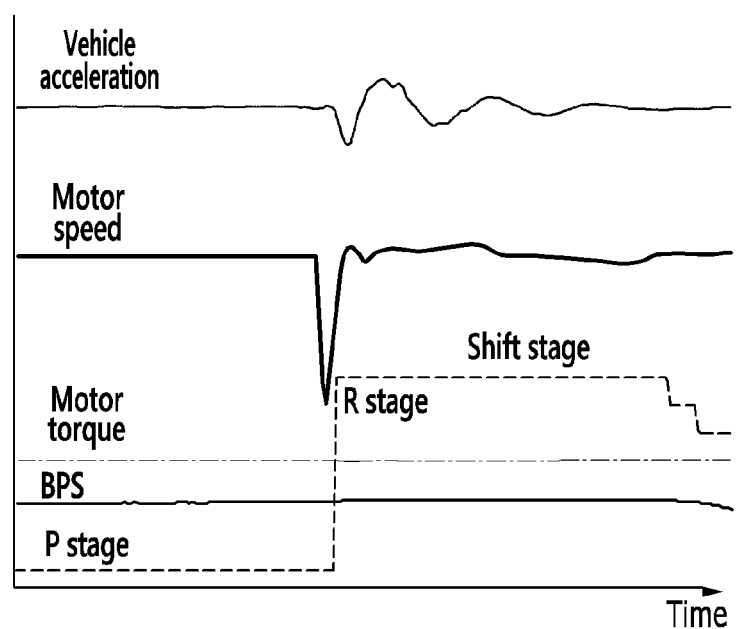
FIG. 5(c) is a graph showing a state of an electric vehicle to which anti-jerk is applied according to an exemplary embodiment of the present invention.

FIG. 5(a) is a drawing showing a state of an electric vehicle to which anti-jerk is not applied, FIG. 5(b) is a drawing showing a state of an electric vehicle to which anti-jerk is applied according to a conventional art, and FIG. 5(c) is a drawing showing a state of an electric vehicle to which anti-jerk is applied according to an exemplary embodiment of the present invention.

As shown in FIG. 5(a), a strong vibration may be generated when anti-jerk is not applied to the electric vehicle. Moreover, as shown in FIG. 5(b), even though anti-jerk according to a conventional art is applied to the electric vehicle, a weak vibration may be still generated. However, as shown in FIG. 5(c), when anti-jerk according to an exemplary embodiment of the present invention is applied to the electric vehicle, vibration of the electric vehicle may be minimized.

As described above, according to an exemplary embodiment of the present invention, impact generated while releasing the P stage on the sloped road can be reduced by applying the torque for impact reduction to minimize distortion of the driving system and by differentiating anti-jerk control in accordance with the degree of road slope.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for controlling impact reduction of an electric vehicle including a motor as a power source, comprising:
    determining whether a torque applying condition is satisfied when a release of a P stage of a shift lever is required on a sloped road;
    calculating a torque for impact reduction when the torque applying condition is satisfied;
    applying the torque for impact reduction and controlling anti-jerk to change;
    stopping applying the torque for impact reduction when a vehicle speed is greater than or equal to a predetermined speed; and
    controlling anti-jerk to restore when the release of the P stage of the shift lever is completed.

2. The method of claim 1, wherein the torque for impact reduction is calculated based on a vehicle weight, a wheel radius, a shift ratio, and an amount of braking requirement.

3. The method of claim 1, wherein the torque applying condition is satisfied when an acceleration sensor is not in a malfunction state, the vehicle speed is less than the predetermined speed, and the amount of braking requirement is greater than or equal to a predetermined value.

4. The method of claim 1, wherein the change control of anti-jerk adjusts an anti-jerk gain and a coefficient of a vibration component extraction filter according to a degree of road slope.

5. The method of claim 1, further comprising:
    when the torque applying condition is not satisfied, controlling anti-jerk to change; and
    controlling anti-jerk to restore when the release of the P stage of the shift lever is completed.

6. A system for controlling impact reduction of an electric vehicle including a motor as a power source, comprising:
    a driving information detector configured to detect a vehicle speed, a degree of road slope, a position value of a brake pedal, and a shift lever of the electric vehicle; and
    a controller configured to control a motor torque based on a signal from the driving information detector,
    wherein the controller determines whether a torque applying condition is satisfied when a release of a P stage of the shift lever is required on a sloped road, calculates a torque for impact reduction when the torque applying condition is satisfied, applies the torque for impact reduction, controls anti-jerk to change, stops applying the torque for impact reduction when a vehicle speed is greater than or equal to a predetermined speed, and controls anti-jerk to restore when the release of the P stage of the shift lever is completed.

7. The system of claim 6, wherein the controller calculates the torque for impact reduction based on a vehicle weight, a wheel radius, a shift ratio, and an amount of braking requirement.

8. The system of claim 6, wherein the controller determines that the torque applying condition is satisfied when an acceleration sensor is not in a malfunction state, the vehicle speed is less than the predetermined speed, and the amount of braking requirement is greater than or equal to a predetermined value.

9. The system of claim 6, wherein the controller controls anti-jerk to change by adjusting an anti-jerk gain and a coefficient of a vibration component extraction filter according to the degree of road slope.

10. The system of claim 6, wherein the controller controls anti-jerk to change when the torque applying condition is not satisfied and controls anti-jerk to restore when the release of the P stage of the shift lever is completed.

11. A non-transitory computer readable medium containing program instructions executed by a processor, the computer readable medium comprising:
    program instructions that determine whether a torque applying condition is satisfied when a release of a P stage of a shift lever is required on a sloped road;
    program instructions that calculate a torque for impact reduction when the torque applying condition is satisfied;
    program instructions that apply the torque for impact reduction and controlling anti-jerk to change;
    program instructions that stop applying the torque for impact reduction when a vehicle speed is greater than or equal to a predetermined speed; and
    program instructions that control anti-jerk to restore when the release of the P stage of the shift lever is completed.

* * * * *